(12) United States Patent
Goto

(10) Patent No.: US 12,504,965 B2
(45) Date of Patent: Dec. 23, 2025

(54) UPDATE CONTROL DEVICE, UPDATE CONTROL METHOD, AND NON-TRANSITORY COMPUTER READABLE STORAGE MEDIUM

(71) Applicant: DENSO CORPORATION, Kariya (JP)

(72) Inventor: Fumihide Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 18/317,127

(22) Filed: May 15, 2023

(65) Prior Publication Data

US 2023/0376298 A1 Nov. 23, 2023

(30) Foreign Application Priority Data

May 20, 2022 (JP) ................................ 2022-083059

(51) Int. Cl.
- *G06F 8/65* (2018.01)
- *G06F 8/61* (2018.01)
- *G06F 9/50* (2006.01)

(52) U.S. Cl.
CPC .................. *G06F 8/65* (2013.01); *G06F 8/61* (2013.01); *G06F 9/5038* (2013.01)

(58) Field of Classification Search
USPC ....................................................... 717/168
See application file for complete search history.

(56) References Cited

U.S. PATENT DOCUMENTS 9,081,640 B2 * 7/2015 Kikuchi ..................... G06F 8/65
10,354,073 B2 * 7/2019 Koike ..................... G06F 8/656
2018/0300180 A1 * 10/2018 Shepard ..................... G06F 8/65
2021/0155174 A1 5/2021 Harata et al.
2021/0155252 A1 5/2021 Harata et al.
2021/0157492 A1 * 5/2021 Harata .................. G06F 3/0604
2022/0035620 A1 * 2/2022 Hamasaki ................. G06F 8/65

(Continued)

FOREIGN PATENT DOCUMENTS

JP 2012-155682 A 8/2012
JP 2020-027630 A 2/2020

(Continued)

OTHER PUBLICATIONS

Osvaldo Romero; "Applying Over-the-Air Updates in Safely Automotive ECUs"; NPX/com website [full URL included in ref.]; May 25, 2021 (Year: 2021).*

(Continued)

*Primary Examiner* — Yashita Sharma
*Assistant Examiner* — Clint Thatcher
(74) *Attorney, Agent, or Firm* — Harness, Dickey & Pierce, P.L.C.

(57) ABSTRACT

An update control device is connected to first and second electronic control units installing first and second software, respectively. First and second update files for updating the first and second software, respectively, are acquired. An update order is determined such that the updating of the second software is executed after the updating of the first software is executed when the first update file is for updating the first software as an application software, and the second update file is for updating the second software as a basic software. The updating of the first and second software using the first and second update files are instructed according to the update order.

12 Claims, 9 Drawing Sheets

(56) References Cited

U.S. PATENT DOCUMENTS

| | | | | |
|---|---|---|---|---|
| 2022/0066768 A1* | 3/2022 | Takatsuna | ............... | H04L 67/34 |
| 2022/0153164 A1 | 5/2022 | Tasaki | | |
| 2022/0197630 A1 | 6/2022 | Kobayashi | | |
| 2022/0334821 A1* | 10/2022 | Sakai | ........................ | G06F 8/65 |
| 2023/0418582 A1* | 12/2023 | Nagarajan | ................. | G06F 8/65 |

FOREIGN PATENT DOCUMENTS

| | | |
|---|---|---|
| JP | 2020-027642 A | 2/2020 |
| JP | 2020-142565 A | 9/2020 |
| JP | 2020-164113 A | 10/2020 |

OTHER PUBLICATIONS

"Comparison of AUTOSAR Classic and Adaptive Platforms"; Mathworks.com website as captured by the Wayback Machine Internet Archive (archive.org) on Sep. 17, 2021 (Year: 2021).*

* cited by examiner

FIG. 8

| UPDATE ORD | UPDATE TAR SOFT | NUM OF STORAGE REG | RELATION BET AVAIL MEM CAPA AND DATA AM OF UPDATE FILE |
|---|---|---|---|
| 1 | APP SOFT | MULTIPLE | DATA AM < AVAIL CAPA |
| 2 | APP SOFT | SINGLE | DATA AM < AVAIL CAPA |
| 3 | APP SOFT | MULTIPLE | DATA AM > AVAIL CAPA |
| 4 | APP SOFT | SINGLE | DATA AM > AVAIL CAPA |
| 5 | BASIC SOFT | MULTIPLE | — |
| 6 | BASIC SOFT | SINGLE | — |

UPDATE CONTROL DEVICE, UPDATE CONTROL METHOD, AND NON-TRANSITORY COMPUTER READABLE STORAGE MEDIUM

CROSS REFERENCE TO RELATED APPLICATIONS

The present application claims the benefit of priority from Japanese Patent Application No. 2022-083059 filed on May 20, 2022. The entire disclosure of the above application is incorporated herein by reference.

TECHNICAL FIELD

The present disclosure relates to an update control device, which is a device that controls updating of software installed in an in-vehicle electronic control unit, an update control method, and a non-transitory computer readable storage medium.

BACKGROUND

Vehicles are equipped with various electronic control units connected by an in-vehicle network. With the recent development of autonomous driving technology, the functions required for vehicles are becoming more complex, and the number of electronic control units mounted on vehicles is increasing.

An increase in the number of electronic control units also complicates the processes of updating the software for each electronic control unit when the update of the electronic control unit is needed. For example, Patent Literature 1 discloses that an in-vehicle update device is provided as a gateway in an in-vehicle device, and the in-vehicle update device distributes an update program to each in-vehicle ECU.

SUMMARY

According to an example, an update control device is connected to first and second electronic control units installing first and second software, respectively. First and second update files for updating the first and second software, respectively, are acquired. An update order is determined such that the updating of the second software is executed after the updating of the first software is executed when the first update file is for updating the first software as an application software, and the second update file is for updating the second software as a basic software. The updating of the first and second software using the first and second update files are instructed according to the update order.

BRIEF DESCRIPTION OF THE DRAWINGS

The above and other objects, features and advantages of the present disclosure will become more apparent from the following detailed description made with reference to the accompanying drawings. In the drawings:

FIG. 8 is a diagram for explaining an update order using the update order determination method of each embodiment.

DETAILED DESCRIPTION

Here, as a result of detailed consideration by the inventor, the inventor found the following difficulty. If an error occurs while updating multiple electronic control units that constitute the electronic control system, and some electronic control units are not completely updated, the updated electronic control units and the electronic control units that have not been updated exist in the electronic control system. In such a case, there is a possibility that the process cannot be executed normally due to the different versions of the cooperating electronic control units. Therefore, when the updating of one of electronic control units fails, it may be desirable to perform so-called rollback process to return all electronic control units to the version before update. However, the difficulty of rollback differs depending on the type of software as a update target and the configuration of the electronic control unit.

Accordingly, the present embodiments provide a device that performs update control so that update process is executed according to software with simple rollback process.

An update control device according to an aspect of the present embodiments is connected via a communication network to a first electronic control unit on which a first software is installed and a second electronic control unit on which a second software is installed. The update control device includes: a file acquisition unit hat acquires a first update file for updating the first software and a second update file for updating the second software; an update order determination unit that determines an update order that the updating of the second software is executed after the updating of the first software is executed in a case where the first update file is an update file for updating the first software that is an application software, and the second update file is an update file for updating the second software that is a basic software as a basis on which the application software operates; and an update instruction unit that instructs an execution of the updating of the first software using the first update file and an execution of the updating of the second software using the second update file according to the update order.

According to the above configuration, by executing the update process of the electronic control units in an order with considering the rollback process, even if the updating of some of the electronic control units fails during the updating of the plurality of electronic control units is executed, the rollback process can be easily executed.

Embodiments of the present disclosure will be described below with reference to the drawings.

A difficulty described above is not a publicly known matter but is originally found by the inventor in the present disclosure, and is a fact that confirms non-obviousness of the present application together with a configuration and a method described in the present disclosure.

Figure 1A:
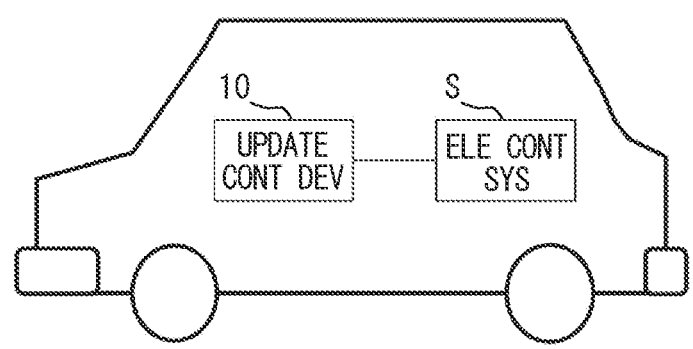
FIGS. 1A and 1B are diagrams for explaining the arrangement of an update control device according to each embodiment.
Figure 1B:
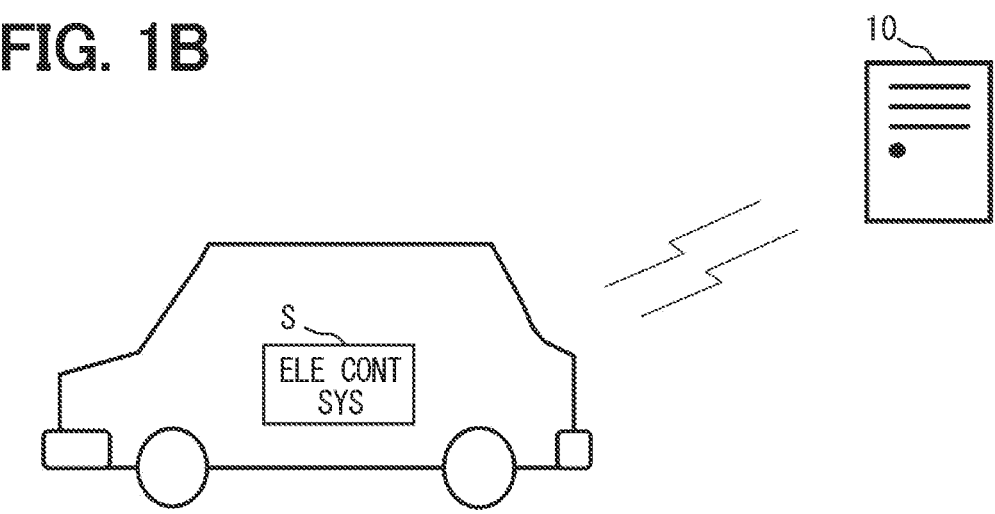

1. Configuration Common to Each Embodiment (1) Arrangement of Update Control Device 10 and Electronic Control System S FIGS. 1A and 1B are diagrams illustrating the arrangement of the update control device 10 of each embodiment. For example, as shown in FIG. 1A, the update control device 10 is "mounted" in a vehicle that is a "mobile object" together with the electronic control system S, and as shown in FIG. 1B, the control system S is "mounted" in a vehicle, which is a "mobile object", and the update control device 10 is realized by a server device arranged outside the vehicle.

The "mobile object" refers to a movable object, and a travel speed is arbitrary. Here, this also includes a case where the mobile object is stopped. Examples of the mobile object include automobiles, motorcycles, bicycles, pedestrians, ships, aircrafts, and objects mounted thereon. However, the mobile object may not be limited to these features. The term "mounted" includes not only a case where an object is directly fixed to the moving object but also a case where an object is moved together with the moving object although the object is not fixed to the moving object. For example, the case may be a case where a person riding on the mobile object carries the object, or a case where the object is mounted on a load placed on the mobile object.

Figure 2:
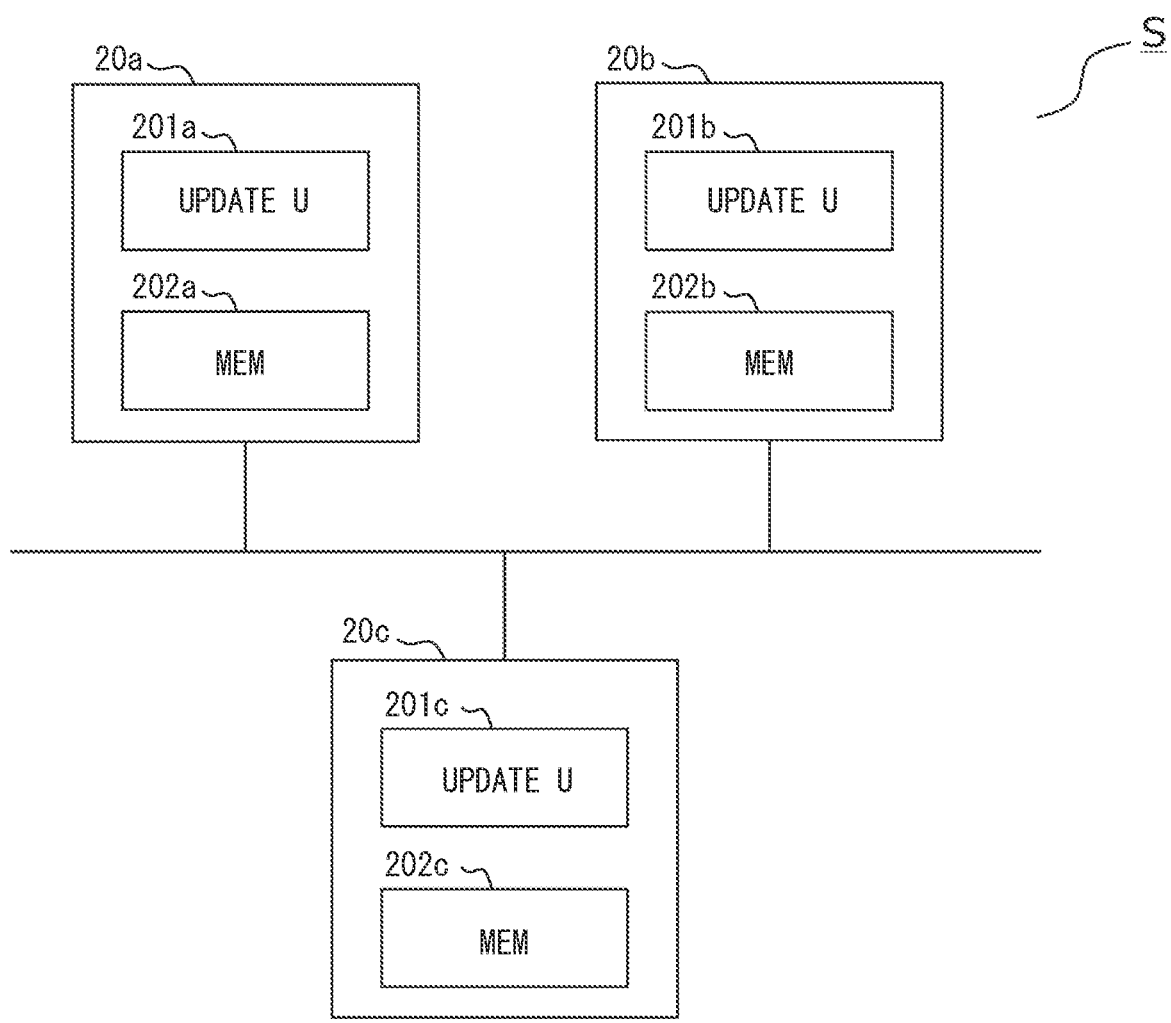
FIG. 2 is a diagram for explaining a configuration example of an electronic control system according to each embodiment.

The update control device 10 is a device that controls updating of software installed in a plurality of electronic control units (hereinafter referred to as ECUs (Electronic Control Units)) that constitute the electronic control system S. FIG. 2 is a diagram showing a configuration example of the electronic control system S. The electronic control system S includes a plurality of ECUs 20. Although FIG. 2 exemplifies three ECUs (ECUs 20a to 20c), the electronic control system S may include any number of ECUs.

In the case of FIG. 1A, the update control device 10 and each ECU 20 are "connected" via an in-vehicle communication network such as CAN (Controller Area Network) or LIN (Local Interconnect Network). Alternatively, connection may be made using any communication method, whether wired or wireless, such as Ethernet (registered trademark), Wi-Fi (registered trademark), or Bluetooth (registered trademark). As another example, at least one of the ECUs 20 that constitute the electronic control system S may incorporate the functions of the update control device 10.

Here, "connection" refers to a state in which data can be exchanged, and includes, in addition to a case where different hardware is connected via a wired or wireless communication network, a case where virtual machines are virtually connected to each other.

For example, among the plurality of ECUs 20 constituting the electronic control system S, the external communication ECU 20 having the function of communicating with the outside of the electronic control system S incorporates the functions of the update control device 10. In this case, the file acquisition unit 101 of the update control device 10, which will be described later, acquires a file for updating software from outside the electronic control system S (for example, a server device). Here, the file acquisition unit 101 that acquires a file from the outside of the electronic control system S may be an OTA (Over The Air) client defined in the AUTOSAR (AUTomotive Open System ARchitecture) specifications.

In another example, among the plurality of ECUs 20 constituting the electronic control system S, the ECU 20 that is not an external communication ECU incorporates the functions of the update control device 10. In this case, the file acquisition unit 101 of the update control device 10 (to be described later) acquires the file from outside the electronic control system S via the external communication ECU 20. Here, the update control device 10 in FIG. 1A may be a UCM (Update and Configuration Management) master defined in the AUTOSAR specifications.

In the case of FIG. 1B, the update control device 10 and each ECU 20 constituting the electronic control system S are "connected" to each other by a communication network such as a wireless communication method, for example, IEEE 802.11 (Wi-Fi (registered trademark)), IEEE 802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, 5G, and the like. Alternatively, Dedicated Short Range Communication (DSRC) can be used. When the vehicle is parked in a parking lot or disposed in a repair shop, a wired communication system may be used instead of a wireless communication system. For example, a local area network (LAN), the Internet, or a fixed telephone line may be used.

In the case of FIG. 1B, the update control device 10, which is a server device, controls the update of the software installed in each ECU 20 constituting the electronic control system S mounted on the vehicle from outside the vehicle.

(2) Configuration of Update Control Device 10

Figure 3:
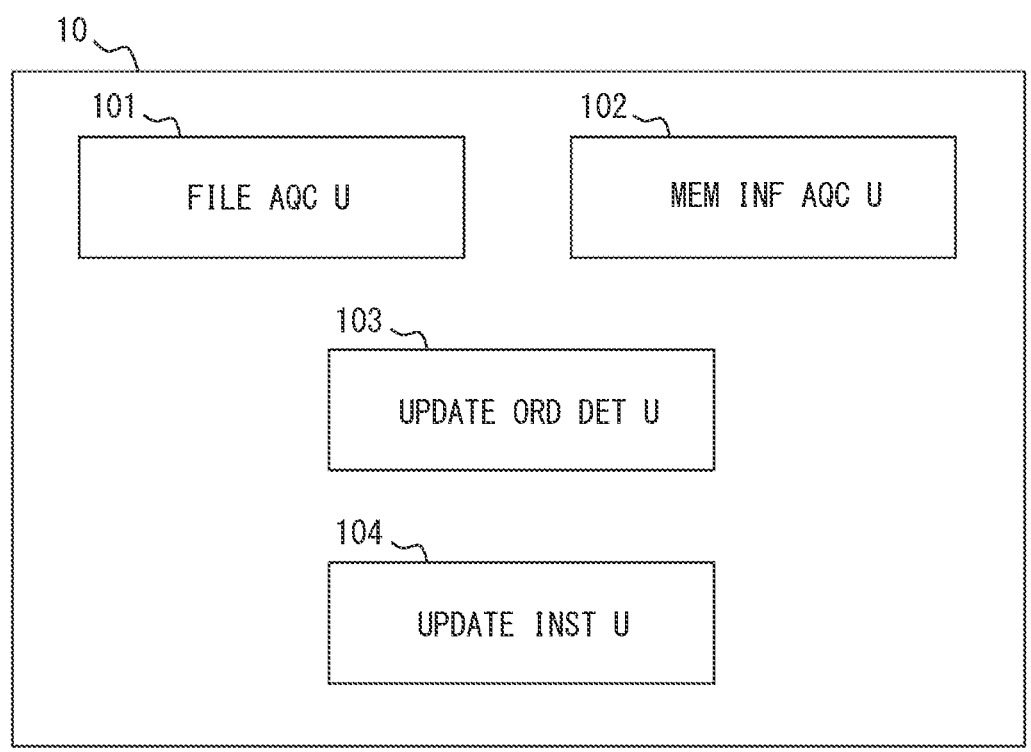
FIG. 3 is a diagram for explaining a configuration example of an update control device according to each embodiment.

A configuration example of the update control device 10 will be described with reference to FIG. 3. The update control device 10 includes a file acquisition unit 101, a memory information acquisition unit 102, an update order determination unit 103 and an update instruction unit 104.

A file acquisition unit 101 acquires an update file. As shown in FIG. 1A, when the update control device 10 is mounted on a mobile object, the file acquisition unit 101 receives the update file from a server device or the like disposed outside the electronic control system S using the OTA (Over The Air) or the wired communication. As shown in FIG. 1B, when the update control device 10 is realized by a server device, the update control device 10 acquires an update file generated by the server device.

The update file acquired by the file acquisition unit 101 includes an update file for updating the "software" installed in each ECU 20, and, for example, may include an update file group including a plurality of update files for updating a plurality of software. Alternatively, the update file acquired by the file acquisition unit 101 may be a file obtained by dividing one update file into a plurality of files. The file acquired by the file acquisition unit 101 may further include information for specifying an ECU on which software to be updated is installed, and information indicating the amount of data in each update file. Hereinafter, software to be updated using an update file is referred to as update target software.

Here, the "software" installed in the electronic control device includes not only software operating on the OS (Operating System) but also middle ware (e.g., OS) for operating the electronic control device itself.

The memory information acquisition unit 102 acquires memory information regarding the memory that each ECU 20 has. The memory information indicates, for example, information about the available capacity of the memory of each ECU 20 and the storage region of the memory. Here, the memory information acquisition unit 102 is a configuration used in second and third embodiments, which will be described later, and the update control device 10 of first embodiment may not necessarily include the memory information acquisition unit 102.

The update order determination unit 103 determines the order in which the updating of software installed in each ECU 20 is executed using the update files acquired by the file acquisition unit 101, that is, the update order. A method for determining the update order by the update order determination unit 103 will be described in detail in each embodiment.

Here, the update order described in each embodiment will be described assuming that the update of the next software is executed after the update of one software is "completed". For example, in the third embodiment, which will be described later, the update is completed when the switching of the storage region is completed. By executing the update of the next software after the update of one software is completed, if the previous software update fails, the target software for rollback process can be limited to the previous software, so that it is not necessary to perform rollback process for the following software.

Here, "completion" of the update may indicate, for example, that the update process ends normally, or that the software that has executed the update process is activated.

Alternatively, it is sufficient that the update order may be such that after one software update is executed, the next software update is executed. The update order may be determined such that the update process of the next software starts before completing the update of one software. In this case, update process for a plurality of ECUs 20 may be executed in parallel.

The update instruction unit 104 "instructs" to update software using the update file in the update order determined by the update order determination unit 103. As shown in FIG. 1A, when the update control device 10 is mounted on a mobile object, the update instruction unit 104 instructs each ECU 20 to perform an update via the in-vehicle communication network. As shown in FIG. 1B, when the update control device 10 is realized by a server device, the update control device 10 uses OTA or wired communication to instruct each ECU to execute an update via the external communication ECU 20. The update instruction unit 104 may transmit the update file acquired by the file acquisition unit 101 together with the update instruction.

Here, "instructing" execution in order of updating indicates that it is sufficient to instruct execution of updating in order, and the method is not limited. For example, in addition to clearly indicating the order in which updates are to be performed, the order may be indicated by rearranging files in the order in which updates are to be performed. In addition, "instruction" of update includes not only direct instruction to the electronic control unit that executes the update but also indirect instruction through another electronic control unit.

For example, the update instruction unit 104 sequentially instructs each ECU to perform update in the update order determined by the update order determination unit 103. Specifically, the update instruction unit 104 instructs one ECU 20 to execute the update, and upon receiving an update completion notification indicating that the update has been completed from the ECU 20, instructs the next ECU 20 to execute the update. Alternatively, the update instruction unit 104 instructs the ECUs 20 to perform the update all at once. Here, the update instruction unit 104 designates the time for each ECU 20 to execute the update process and instructs the execution of the update so that each ECU 20 executes the update in the update order determined by the update order determination unit 103.

In still another example, the update instruction unit 104 rearranges the update files acquired by the file acquisition unit 101 in the update order determined by the update order determination unit 103. As shown in FIG. 1B, when the update control device 10 is realized by a server device, the update instruction unit 104 transmits an update execution instruction and a plurality of update files arranged in the update order to the electronic control system S.

The update instruction unit 104 further instructs to return to the state before the update using the update file when the update of the software in each ECU 20 fails. Specifically, the update instruction unit 104 instructs one ECU 20 to perform the update, and when receiving an update failure notification indicating that the update has failed from this one ECU 20, the update instruction unit 104 instructs the ECU 20 that has performed the software update before this one ECU 20 to return to the state before executing the update. Hereinafter, an instruction to return to the state before update execution is referred to as a rollback instruction. The update instruction unit 104 may further issue a rollback instruction to the ECU 20 in which the software update has failed.

In another example, the update instruction unit 104 may broadcast a rollback instruction to each ECU 20. In this case, among the ECUs 20 that have received the rollback instruction, only the ECUs 20 whose software has been updated perform the rollback process, and the ECUs 20 whose software has not been updated do not perform the rollback process.

Note that the update instruction unit 104 may transmit data required for rollback process, that is, data of the software before update, together with the rollback instruction. In this case, the software data before update may be stored in a memory (not shown) of the update control device 10, or may be newly acquired by the file acquisition unit 101.

The update instruction unit 104 further instructs "update stop" for the software that is scheduled to be updated after the failed software update. When the update instruction unit 104 has not instructed the ECU 20 to update the software, the unit 104 instructs the ECU 20 to stop the update, thereby canceling the transmission of the update instruction. Alternatively, when the update instruction unit 104 has already instructed the ECU 20 to execute the update, the unit 104 may instruct the ECU 20 to stop the update by transmitting an instruction to cancel the execution of the update.

Here, the "update stop" instruction includes canceling the update instruction which has been already transmitted as well as canceling the transmission of the update instruction.

(3) Electronic Control System S and ECU 20

The electronic control system S will be described with reference to FIG. 2. As shown in FIG. 2, the electronic control system S includes a plurality of ECUs 20. Each ECU 20 has an update unit 201 and a memory 202 for executing software update. In FIG. 2 and the following description, each ECU 20 and an element of each ECU 20 are denoted by a to c in order to distinguish between them.

The update unit 201 performs software update process using an update file based on an instruction from the update instruction unit 104. The update unit 201 may be a UCM subordinate defined in the AUTOSAR specifications.

When the software update process is completed, the update unit 201 transmits an update completion notification indicating that the update has been completed to the update control device 10. Further, when the software update process fails, an update failure notification indicating that the update has failed is transmitted to the update control device 10.

Further, when the update unit 201 receives a rollback instruction from the update instruction unit 104, the update unit 201 performs rollback process for returning the software to the state before the update. In order to perform rollback process, software data before update is required. When the memory 202 stores software data before updating, the update unit 201 performs rollback process using the data stored in the memory 202. If the memory 202 does not store the software data before the update, the software data before the update is acquired from the update instruction unit 104.

The memory 202 is a non-volatile memory such as ROM, flash memory, or hard disk, and stores software and update files installed in each ECU. Although not shown in FIG. 2, the memory 202 may have multiple storage regions.

Each ECU 20 of the present embodiment is, for example, an ECU based on a platform defined as Adaptive Platform (hereafter, AP) in the AUTOSAR specifications, which can dynamically expand functions. The AP is primarily a platform suitable for ECUs for autonomous driving. Alternatively, these ECUs may be, for example, ECUs based on a platform in which functions are statically optimized, defined as Classic Platform (CP) in the AUTOSAR specifications. Here, the CP is mainly a platform suitable for vehicle control ECUs.

(4) Operations of Electronic Control System S and Update Control Device 10

Figure 4:
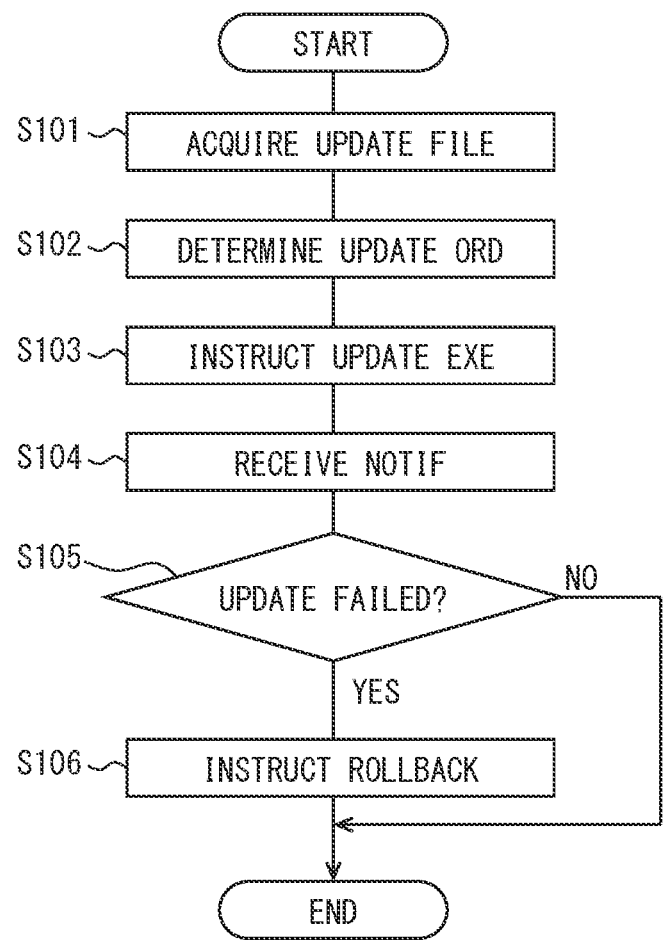
FIG. 4 is a diagram for explaining the operation of an update control device according to each embodiment.

The operation of the update control device 10 of the present embodiment will be described with reference to FIG. 4, and the operation of the whole of the electronic control system S will be described with reference to FIG. 5. The operation shown in FIG. 4 not only shows the update control method executed by the update control device 10, but also shows the processing procedure of the update control program that can be executed by the update control device 10. The order of these processes is not limited to the order shown in FIG. 4. That is, the order may be changed as long as there are no restrictions such as restrictions that have a relationship in which a result of the preceding process is used in a certain process. The same applies to FIG. 5 and FIGS. 6 and 7 described later.

The file acquisition unit 101 of the update control device 10 acquires an update file for updating software installed in each ECU 20 (at S101). In the examples in FIGS. 4 and 5, the update control device 10 acquires an update file a for updating software a installed in the ECU 20a, an update file b for updating software b installed in the ECU 20b, and an update file c for updating software c installed in ECU 20c.

The update order determination unit 103 determines an update order for executing software update using the update file acquired in S101 (at S102). In FIG. 5, it is assumed that the update order is determined such that the update is executed in the order of software a, software b, and software c.

The update instruction unit 104 instructs to execute the update of the software in the order determined in S102 (at S103). Here, in the example of FIG. 5, when an update completion notification is received from an ECU whose update has been completed, the next ECU is instructed to perform the update. Therefore, the update instruction unit 104 first instructs the ECU 20a to perform the update.

The update unit 201a of the ECU 20a that has received the update execution instruction from the update control device 10 executes update process (at S201). Then, when the update process is completed, an update completion notification is transmitted to the update control device 10.

When the update control device 10 receives the update completion notification from the ECU 20a (at S104 and "NO" at S105), it instructs the ECU 20b, the installed software of which is to be updated next, to perform the update (at S103).

The update unit 201b of the ECU 20b that has received the update execution instruction from the update control device 10 executes update process (at S201). Here, when the update process by the update unit 201b fails, the ECU 20b transmits an update failure notification to the update control device 10.

When the update control device 10 receives the update failure notification from the ECU 20b (at S104, and "YES" at S105), it transmits a rollback instruction to the ECU 20b whose update failed and the ECU 20a whose update has already been completed (at S106).

The updating units 201a and 201b of the ECUs 20a and 20b that have received the rollback instruction from the update control device 10 execute rollback process (at S202). In the example of FIG. 5, the update control device 10 does not instruct the ECU 20c to execute the update, so there is no need to transmit the rollback instruction to the ECU 20c. Then, the transmission of the update instruction to the ECU 20c is cancelled. As a result, all of the ECU 20a, the ECU 20b, and the ECU 20c are in the state before executing the update process.

Figure 5:
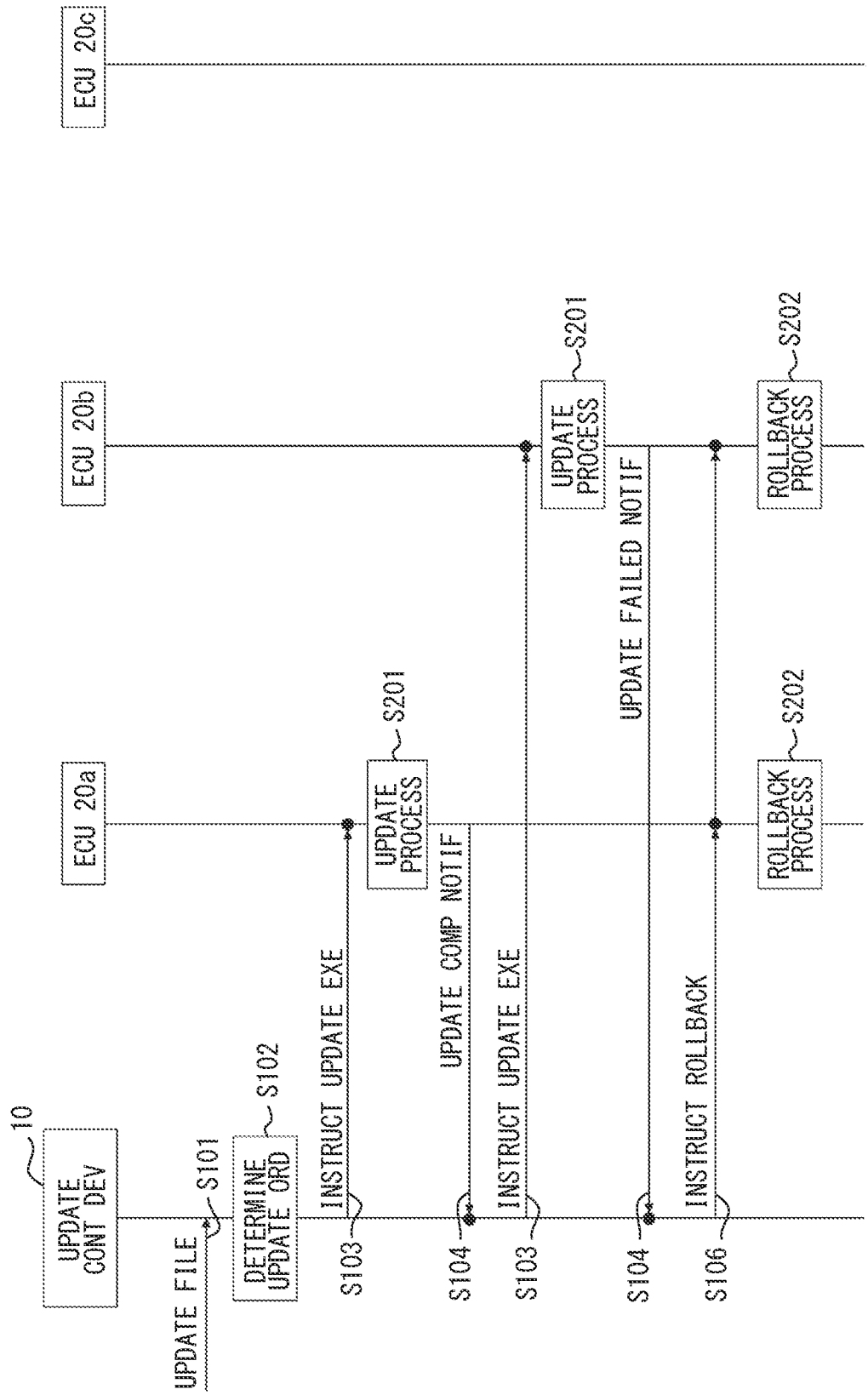
FIG. 5 is a diagram illustrating an operation of the electronic control system as a whole according to each embodiment.
Figure 6:
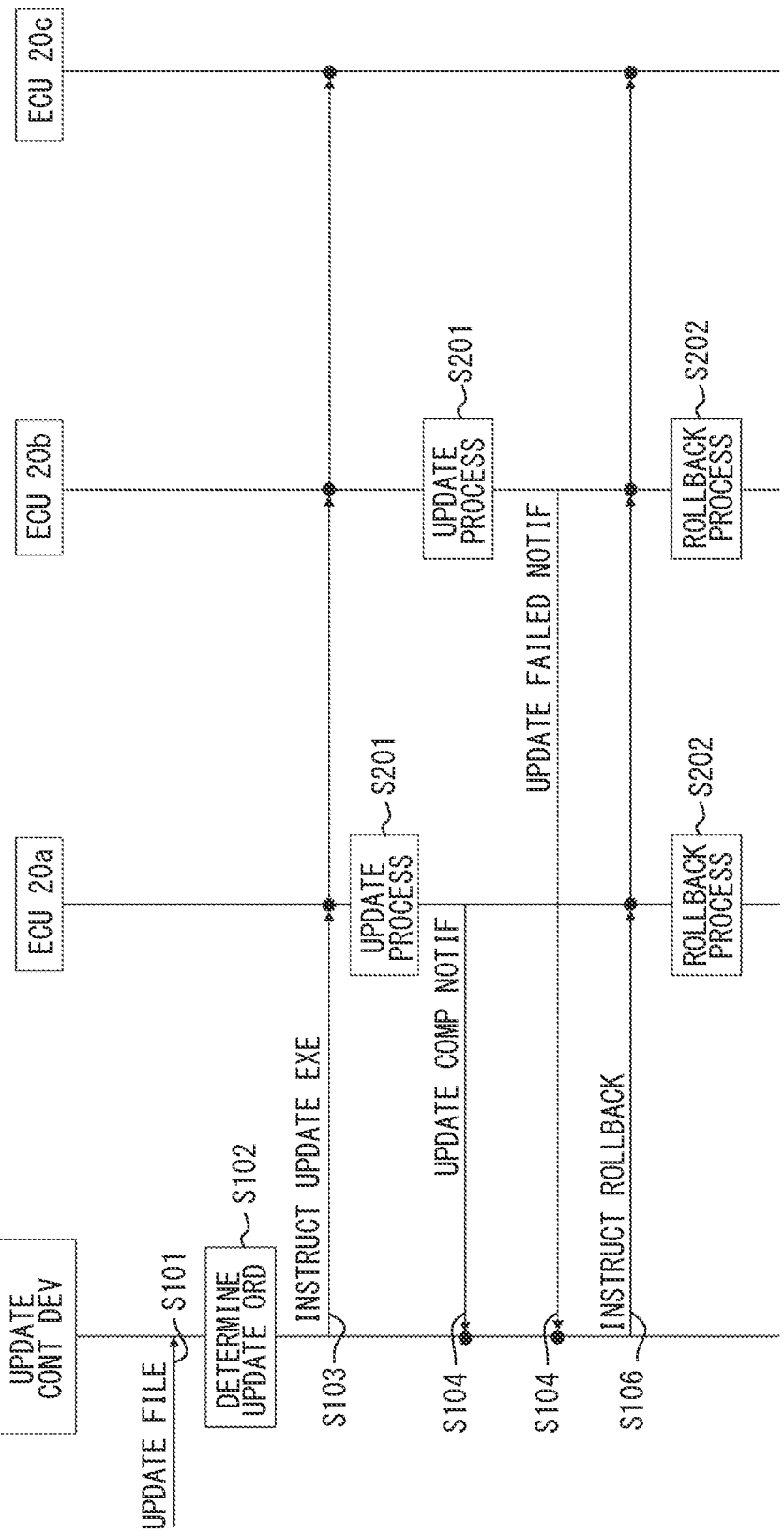
FIG. 6 is a diagram illustrating an operation of the electronic control system as a whole according to each embodiment.
Figure 7:
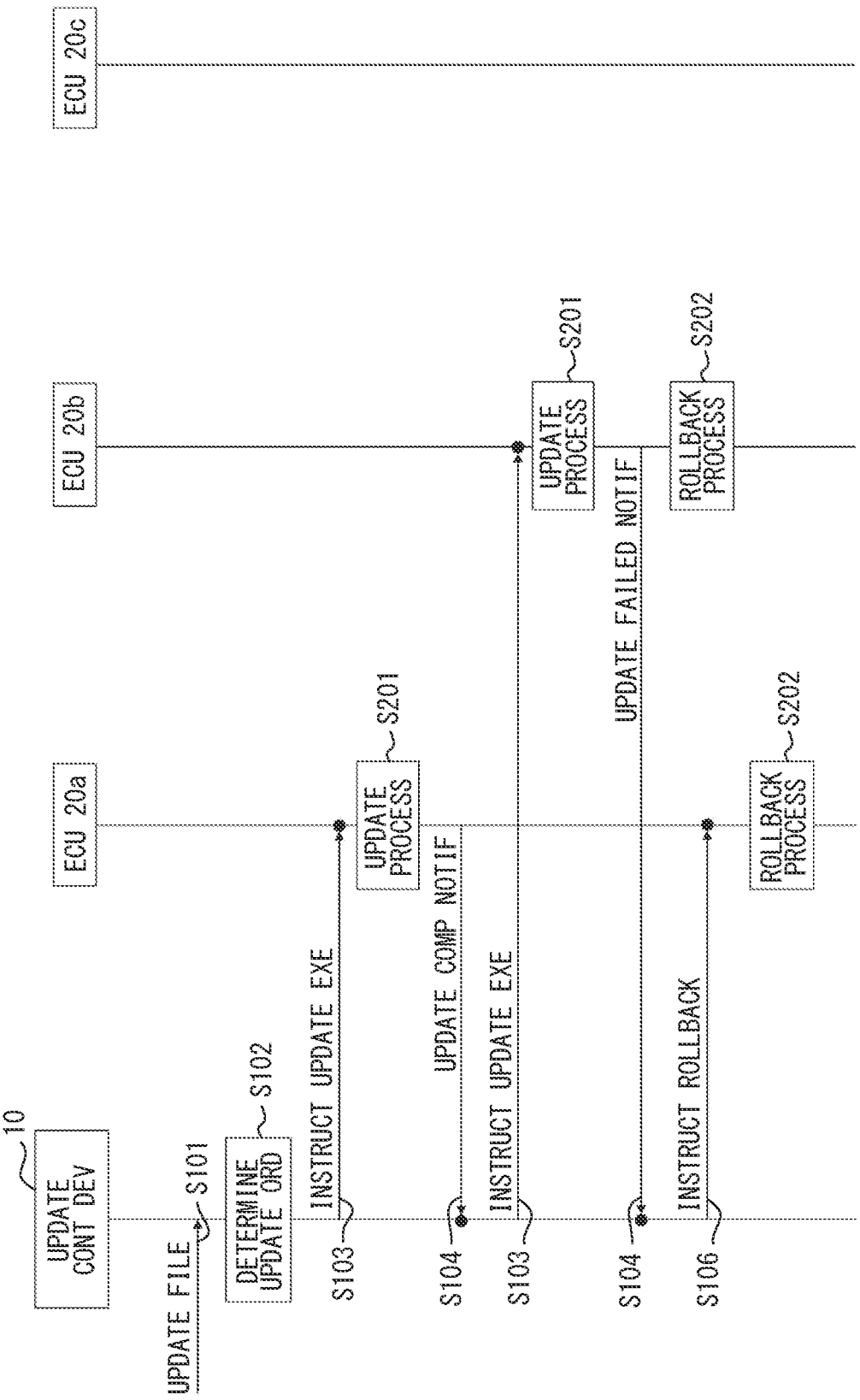
FIG. 7 is a diagram illustrating an operation of the electronic control system as a whole according to each embodiment.

FIGS. 6 and 7 are diagrams for explaining the operation of the electronic control system S different from that in FIG. 5. Unlike FIG. 5, in FIG. 6, the update control device 10 simultaneously instructs the ECU 20a, the ECU 20b, and the ECU 20c to execute the update (at S103). However, the update execution is instructed by designating, for example, the time for executing the update process so that the ECU 20a, the ECU 20b, and the ECU 20c execute the update process in the order determined by the update order determination unit 103.

When the update control device 10 shown in FIG. 6 receives an update failure notification from the ECU 20b (at S104), it transmits a rollback instruction to all the ECUs 20a to 20c that have been instructed to execute the update (at S106). That is, the rollback instruction is transmitted even to the ECU 20c to which the rollback instruction is not transmitted in FIG. 5. Here, since the ECU 20c has not executed the update process, the rollback process is not executed even if the rollback instruction is received by the ECU 20c.

FIG. 7 shows an example in which the ECU 20b whose update failed autonomously performs rollback process without receiving a rollback instruction from the update control device 10. As in FIGS. 5 and 6, the ECU 20b receives an update execution instruction from the update control device 10 and performs update process (at S201). When the update process failed, the update failure notification is transmitted to the update control device 10. Then, the ECU 20b performs rollback process (at S202). That is, in FIG. 7, the rollback instruction is transmitted only to the ECU 20a for which the update process has been completed before the ECU 20 for which the update process failed.

2. First Embodiment

(1) Update Order Determination Method

In this embodiment, the update order is determined according to the update type of update target software installed in the ECU 20. That is, the update order is determined according to whether the update type is image update or application update.

An image update is an update in which software is rewritten for each partition of the memory 202. The partitions are also defined as banks or storage regions. The partitions include logical partitions and partitions in units of physical memory. The image update can be performed by writing the image data of the updated partition to the partition. This image data is an example of an update file for image update that the file acquisition unit 101 acquires from outside the vehicle. The update file for image update that the file acquisition unit 101 acquires from outside the vehicle may be a file that indicates the difference from the software of the partition after the update. In this case, the image data used for writing is generated in the vehicle from the file indicating the difference and the software stored in the partition of the update target ECU. The image update is typically used when updating the OS or the AUTOSAR platform (hereinafter referred to as PF) itself. When the software stored in one partition includes an application that runs on the OS and the AUTOSAR PF in addition to the OS and the AUTOSAR PF, the application that runs on the OS and the AUTOSAR PF together with the OS and the AUTOSAR PF can be updated together during the image update. As such, an image update can also be referred to as an update of the "basic software."

Here, the "basic software" includes not only the OS but also software that configures a virtual machine in the electronic control device and software that configures the platform in the electronic control device.

An application update is an update in which the software stored in the partition of the memory 202 is written or rewritten for each application. The applications mentioned here include the applications that run on the OS and the AUTOSAR AP, software components that constitute the platform defined as Functional Cluster of the AUTOSAR AP, and data sets such as parameters used by applications. An example of an application is an executable file that runs on an OS such as POSIXOS. An application update may also be referred to as an application software update.

For example, an example will be described such that the file acquisition unit 101 acquires an update file a for updating the software a (corresponding to "first software") installed in the ECU 20a (corresponding to "first electronic control unit") among the ECUs shown in FIG. 2, and an update file b for updating the software b (corresponding to "second software") installed in the ECU 20b (corresponding to "second electronic control unit").

The update order determination unit 103 of this embodiment determines whether the update file a and the update file b acquired by the file acquisition unit 101 are software for updating application software or basic software. When the update file a (corresponding to the "first update file") is an update file for updating the application software, and the update file b (corresponding to the "second update file") is an update for updating the basic software, the update order determination unit 103 determines the update order such that the software b is updated after the software a is updated. That is, it determined to execute the update of the basic software after executing the update of the application software. Here, it is assumed that the update of the application software and the update of the basic software are executed to different ECUs, alternatively, they may be executed to different partitions of one ECU. The updating the application software and the updating the basic software are performed as updates to different partitions of one ECU when, for example, the partition for storing the OS and the PF is separate from the partition for storing the application which operates on the OS and the PF.

Since the basic software is software as a basis on which the application software operates, there is a risk that the function of the application software that operates on the basic software or the function of the ECU 20 itself will stop while the basic software is being updated. A similar situation may occur while performing the rollback process of the basic software. In other words, the rollback process of the basic software may cause a plurality of application software functions to stop. Further, the process of rolling back the basic software may often involve restarting the ECU. On the other hand, while update process and the rollback process of the application software are being performed, other application software installed in the same ECU 20 can be operated. Compared to a case where the rollback process of the basic software is executed, the rollback process of the application software may often be performed while the ECU continues the active state. It may be said that the rollback process of the application software is easier than the rollback process of the basic software. Also, the rollback process of the application software may often have less influence on other application software than the rollback process of the basic software.

Therefore, in the present embodiment, the update order is determined such that the update of the basic software is executed after the update of the application software is executed. That is, the update order is determined such that the update is executed in order from the rollback easy one. As a result, even if the update of the ECU 20 fails and the rollback process becomes necessary, the possibility of performing the rollback process of the basic software can be reduced.

(2) Modifications

In the above-described embodiment, an example of determining the update order has been described in a case where the update of software stored in the same partition of the ECU is either application software or basic software. However, both basic software and application software stored in the same partition of one ECU 20 may need to be updated.

For example, when the updating of the software a1 that is application software of the ECU 20a, the updating of the software a2 that is basic software of the ECU 20a, and the updating of the software b that is application software of the ECU 20b are executed, according to the first embodiment described above, the update order determination unit 103 determines the update order such that the updating of the software a2 of the ECU 20a is executed after the updating of the software a1 of the ECU 20a and the updating of the software b of the ECU 20b are executed.

Here, in the application software, the version of the basic software on which the software operates may be sometimes designated. In such a case, when the application software is updated before updating the basic software, the version in the application software and the version of the basic software may differ, and the application software may not operate normally.

Therefore, when both the basic software and the application software need to be updated in one ECU, the application software may be updated after the basic software is updated.

For example, when the updating of the software a1 that is application software of the ECU 20a, the updating of the software a2 that is basic software of the ECU 20a, and the updating of the software b that is application software of the ECU 20b are executed, the update order determination unit 103 according to the modification determines the update order such that the updating of the software a2 of the ECU 20a is executed after the updating of the software b of the ECU 20b is executed, and then, the updating of the software a1 of the ECU 20a is executed.

As described above, according to this modification, when both the basic software and the application software are updated in one ECU, the application software is updated after the basic software is updated. This prevents the application software from malfunctioning due to a version difference between the application software and the basic software.

3. Second Embodiment

In this embodiment, the update order is determined according to the amount of data in the update file and the available memory capacity in the memory of the ECU. The available memory capacity of the memory is synonymous with the free space of the partition of the memory that stores the update target software, that is, the destination memory to which the update file is written.

In this embodiment, the memory information acquisition unit 102 acquires memory information indicating the available memory capacity of the memory of each ECU 20.

The update order determination unit 103 determines the update order based on the data amount of each update file acquired by the file acquisition unit 101 and the available memory capacity of each ECU 20 acquired by the memory information acquisition unit 102. Specifically, the update order is determined such that the update of the software using the update file whose data amount is smaller than the available memory capacity is executed, and then, the update of the software using the update file whose data amount is larger than the available memory capacity is executed.

For example, an example case is described such that the file acquisition unit 101 acquires an update file a (corresponding to the "first update file") for updating the software a (corresponding to the "first software") installed in the ECU 20a (corresponding to the "first electronic control unit") and an update file c (corresponding to the "third update file") for updating the software c (corresponding to the "third software") installed in the ECU 20c (corresponding to the "third electronic control unit") among the plurality of ECUs 20 shown in FIG. 2. Here, both the update file a and the update file c are update files for updating application software.

The memory information acquiring unit 102 acquires the available memory capacity (corresponding to the "first available memory capacity") of the memory 202a (corresponding to the "first memory") of the ECU 20a and the available memory capacity (corresponding to the "second available memory capacity") of the memory 202c (corresponding to the "second memory") of the ECU 20c.

Then, the update order determination unit 103 determines whether the data amount of the update file a (corresponding to the "first data amount") is larger than the available memory capacity of the memory 202a, and determines whether the data amount of the update file c (the "second data amount) is larger than the available memory capacity of the memory 202c. Here, when it is determined that the data amount of update file a is smaller than the available memory capacity of the memory 202a and the data amount of update file c is larger than the available memory capacity of the memory 202c, the update order determination unit 103 determines the update order such that the update of the software a is executed, and after that, the update of the software c is executed. That is, in the present embodiment, it is determined that the update to be expected earlier is the update using the update file having the data amount smaller than the available memory capacity of the memory.

When the amount of data in the update file is larger than the available memory capacity of the memory, the update process is executed by deleting or overwriting the software before the update and writing the update file. Therefore, if the update by the update unit 201 fails and the rollback process is executed, the rollback process cannot be performed unless the software data before the update is acquired again. On the other hand, if the data amount of the update file is smaller than the available memory capacity, the update unit 201 can write the update file in the available memory capacity of the memory 202 and leave the original software in the memory 202. That is, the update unit 201 stores the software before update and the software after update in the memory 202. Then, when the update process is completed, the software to be executed is switched from the software before update to the software after update. Further, even if the update by the update unit 201 fails, it is possible to easily perform rollback process by using the software before left in the memory 202.

As described above, the updating of the basic software, that is, the image updating, writes or rewrites in units of partitions. Therefore, one partition as a whole becomes either a state before update or a state after update. Therefore, of the image update and the application update, the above-described configuration can be applied only to the application update that writes or rewrites the software stored in the partition for each application.

Next, the update order determination unit 103 will be described in a case where the amounts of data of both the update file a and the update file c are smaller or larger than the available memory capacity of the memory 202a and the memory 202c, respectively. In this case, the update order determination unit 103 determines the update order in which the update using the update files are executed ascending order of data amount. For example, when the amount of data in the update file a is 10 MB and the amount of data in the update file c is 20 MB, the update order is determined such that the update of the software a using update file a is executed, and after that, the update of the software c using update file c is executed.

The smaller the amount of data in the update file, the less the time and processing load required for rollback process. Therefore, by first executing software update using an update file with a small amount of data, even if the rollback process is required, a possibility is reduced such that the software with a large processing load will be rolled back.

4. Third Embodiment (1) Update Order Determination Method

In this embodiment, the update order is determined according to the number of storage regions of the memory 202 that each ECU 20 has.

In this embodiment, the memory information acquisition unit 102 acquires memory information indicating the number of storage regions of the memory of each ECU 20.

The update order determination unit 103 determines the update order based on the "number of storage regions" of the memory 202 of each ECU 20 acquired by the memory information acquisition unit 102. Specifically, the update order is determined such that the update of the software installed in the ECU 20 having the memory 202 with one storage region is executed after the update of the software installed in the ECU 20 having the memory 202 with a plurality of storage regions is executed. As noted above, storage regions of the memory 202 are also referred to as partitions or banks of the memory 202.

Here, "the number of storage regions" is the number of areas in which data can be stored in the memory. When the "number of storage regions" is multiple, this feature includes not only a case where the number of storage regions is multiple due to the existence of two physical memories, but also a case where the number of storage regions is multiple due to a storage region of the one physical memory divided by multiple addresses.

When the memory 202 has a plurality of storage regions, one of the plurality of storage regions is a storage region operated by the ECU 20, and the other storage regions are storage regions not operated. In other words, a feature that the memory 202 has a plurality of storage regions indicates that it has an operation storage region and a not-operating storage region. Here, the operating storage region and the not-operating storage region of the ECU 20 can be switched as appropriate. For example, when the ECU 20 has two storage regions (i.e., storage regions A and B), while the storage region A is being used as an operating storage region, the storage region B is a not-operating storage region. While the storage region A is an operating storage region, the ECU 20 can use the software stored in the storage region A and cannot use the software stored in the storage region B. By switching the operating storage region from the storage region A to the storage region B, the software to be used can also be switched.

Below, an example case will be explained such that the file acquisition unit 101 acquires an update file a for updating the software a installed in the ECU 20a and an update file c for updating the software c installed in the ECU 20c among the plurality of ECUs 20 shown in FIG. 2. Here, both the update file a and the update file c are update files for updating the basic software.

The memory information acquisition unit 102 acquires memory information indicating the number of storage regions in the memory 202a (corresponding to the "first memory") of the ECU 20a and the number of storage regions in the memory 202c (corresponding to the "second memory") of the ECU 20c.

Then, the update order determination unit 103 determines the number of storage regions in the memory 202a and the number of storage regions in the memory 202c. Here, when the memory 202a has a plurality of storage regions and the memory 202c has a single storage region, the update order determination unit 103 determines the update order such that the update of the software c is executed after the update of the software a is executed. That is, in the present embodiment, it is determined to first execute the update of the software of the ECU equipped with a memory having a plurality of storage regions.

When the memory 202 has a plurality of storage regions, it is possible to store updated software in another storage region while the software before update remains in one storage region. For example, the update unit 201 stores the updated software in the not operating storage region while leaving the software before update in the operating storage region of the memory 202. After the update process is completed, the ECU 20 can execute the updated software by switching the operating storage region. Note that the software before update may be deleted after all the ECUs 20 have been updated.

When the memory 202 has a plurality of storage regions, even if the software update by the update unit 201 fails, the software before update remaining in the other storage region can be used continuously.

Although this embodiment has been described by exemplifying the updating of the basic software, this embodiment can also be applied to application software. That is, it is possible to store the updated software in another storage region while the application software before update remains in one storage region.

However, with regard to application software, if the updated version of the application software is different from the version of the OS or platform, the updated application software may not operate normally. In this case, the storage region for storing the updated application software is limited to the storage region for storing the basic software of the same version as the application software.

For example, if the version of the application software after update is the same as the version of the OS stored in the operating storage region but different from the version of the OS stored in the not operating storage region, the updated application software may not operate properly unless the updated application software is stored in the operating storage region. In this case, the application software is stored in the operating storage region. Note that the update control device 10 may instruct which storage region the application software is to be stored in consideration of the version of each storage region.

5. Combination of First to Third Embodiments

The update order determination unit 103 may determine the update order of the software installed in each ECU 20 by combining the update order determination methods of the first to third embodiments described above. Determination of the update order when the first to third embodiments are combined will be described below. Here, the update order determination methods of two of the first to third embodiments described above may be combined.

FIG. 8 shows the order determined by the update order determination unit 103 based on whether the update target software is application software or basic software, whether the amount of data in the update file is larger than the available memory capacity of the memory, and whether the storage region of the memory is one or more.

The update order determination unit 103 determines to execute update process in the following update order:

Updating software that is application software for the ECU 20 in which the memory 202 has a plurality of storage regions and the amount of data in the update file is smaller than the available memory capacity of the memory 202;

Updating software that is application software for the ECU 20 in which the memory 202 has a single storage region and the amount of data in the update file is smaller than the available memory capacity of the memory 202;

Updating software that is application software for the ECU 20 in which the memory 202 has a plurality of storage regions and the amount of data in the update file is larger than the available memory capacity of the memory 202;

Updating software that is application software for the ECU 20 in which the memory 202 has a single storage region and the amount of data in the update file is larger than the available memory capacity of the memory 202;

Updating the basic software of the ECU 20 in which the memory 202 has a plurality of storage regions; and Updating the basic software of the ECU 20 in which the memory 202 has a single storage region.

As described in the first embodiment, the rollback process of the basic software may cause the application software to stop functioning. Therefore, the update of the basic software is executed after the execution of the update of the application software.

Furthermore, as described in the second embodiment, when the data amount of the update file is smaller than the available memory capacity of the memory 202, the application software data before the update can be left in the storage region. Thus, the rollback process can be executed without newly acquiring the software data before update. Therefore, after executing the software update using the update file with the data amount smaller than the available memory capacity of the memory, the software update is executed using the update file with the data amount larger than the available memory capacity of the memory.

Furthermore, as described in the third embodiment, when the memory 202 has a plurality of storage regions, the software data before update can be left in the not operating storage region. Thus, it is possible to perform rollback process without newly acquiring the software data before update. Therefore, after updating the software of the ECU 20 equipped with the memory 202 having a plurality of storage regions, the software of the ECU 20 equipped with the memory 202 having one storage region is updated.

Some of the software installed in the ECU 20 may use a plurality of storage regions, and some of the software may use a single storage region. For example, an OS may use only one storage region and an application may use multiple storage regions. In such a case, the application software of the ECU 20 having multiple storage regions is updated, and then the basic software of the ECU 20 having one storage region is updated.

6. Modifications of Each Embodiment

In the above-described embodiment, the ECU 20 constituting the electronic control system S is described to be different hardware. Further, as shown in FIG. 1A, when the update control device 10 is mounted on a mobile object, the description has been made on the condition that the update control device 10 and each ECU 20 are different hardware. However, the update control device 10 and each ECU 20 in FIG. 1A may not be limited to different hardware configurations.

Figure 9:
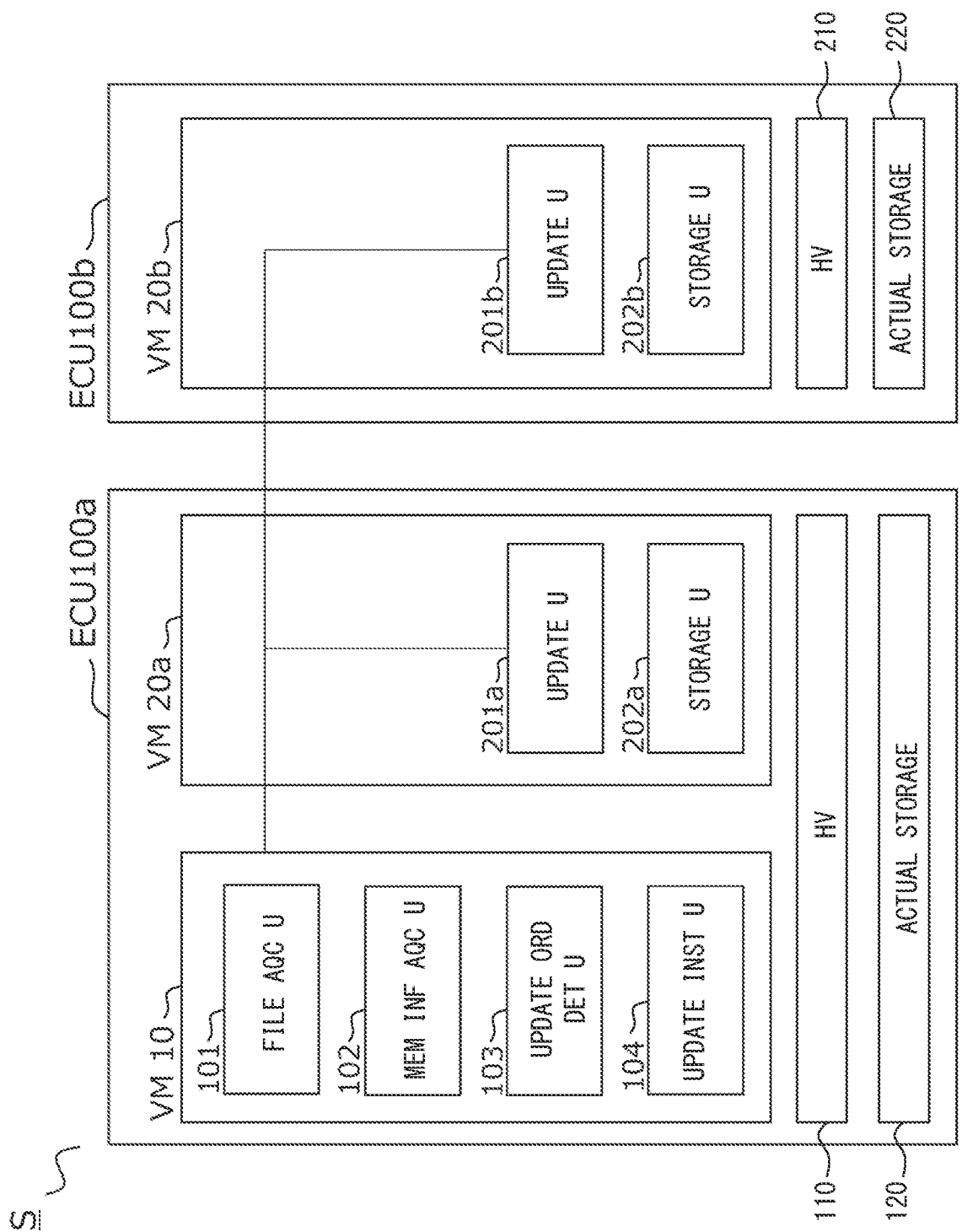
FIG. 9 is a diagram for explaining a configuration example of an update control device and an electronic control system according to a modification of each embodiment.

An example of the electronic control system S of this modification will be described with reference to FIG. 9. Although FIG. 9 illustrates two ECUs 100a and 100b as ECUs constituting the electronic control system S, the electronic control system S may include an arbitrary number of ECUs. Each ECU constituting the electronic control system S has a virtual machine (abbreviated as VM (Virtual Machine) on the drawing).

The ECU 100 a includes virtual machines 10 and 20a, a hypervisor (abbreviated as HV (Hypervisor) on the drawing) 110, and an actual storage 120. The hypervisor 110 is software that virtualizes the ECU 100a. In the example of FIG. 9, the virtual machines 10 and 20a are established on the hypervisor 110. Virtual machines established on the hypervisor 110 are virtually connected to each other.

The ECU 100b is an ECU connected to the ECU 100a via a communication network, and includes a virtual machine 20b, a hypervisor 210, and an actual storage 220. Similar to the ECU 100a, the hypervisor 210 is software that virtualizes the ECU 100b, and the virtual machine 20b is established on the hypervisor 210.

Both of the actual storages 120 and 220 are hardware memories, such as volatile memories such as SRAM and DRAM, ROMs, flash memories, or non-volatile memories such as hard disks. The storage unit 202a of the virtual machine 20a is a virtual memory realized by virtualizing the storage region of the actual storage 120. The same applies to the storage unit 202b.

The virtual machine 10 of this modification implements a file acquisition unit 101, a memory information acquisition unit 102, an update order determination unit 103, and an update instruction unit 104. The functions and operations of the file acquisition unit 101, the memory information acquisition unit 102, the update order determination unit 103, and the update instruction unit 104 in this modification are the same as those in each embodiment. That is, the virtual machine 10 of this modified example functions as the update control device 10 of the first to third embodiments described above.

Further, the virtual machines 20a and 20b of the present embodiment implement update units (201a and 201b) and memories (202a and 202b), respectively, like the ECUs 20a and 20b of each embodiment. The functions and operations of update units 201a and 201b and memories 202a and 202b of this modified example are the same as those of each embodiment. That is, the virtual machines 20a and 20b of this modified example function as the ECUs 20a to 20c of the first to third embodiments described above.

7. Overview

The features of the update control device according to each embodiment of the present disclosure have been described above.

Since the terms used in each embodiment are examples, the terms may be replaced with terms that are synonymous or include synonymous functions.

The block diagrams used for the description of the embodiments are obtained by classifying and arranging the configurations of the device for each function. The blocks representing the respective functions may be implemented by any combination of hardware or software. Further, since the block diagrams illustrate the functions, the block diagrams can be understood as disclosure of the method and the program that implements the method.

Functional blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each embodiment and in the claims are used to distinguish two or more configurations and methods of the same kind and are not intended to limit the order or superiority.

The update control device of each embodiment is a device for controlling the update of an electronic control unit that constitutes an in-vehicle system mounted in a vehicle. The update control device may apply to devices that control the updating of any electronic control unit unless otherwise specified in the scope of the disclosure.

Further, examples of the device described in the present disclosure include the following.

Examples of a form of a component include a semiconductor element, an electronic circuit, a module, and a microcomputer.

Examples of a form of a semifinished product include an electronic control device (electronic control unit (ECU)) and a system board.

Examples of a form of a finished product include a cellular phone, a smartphone, a tablet computer, a personal computer (PC), a workstation, and a server.

The devices may include a device having a communication function and the like, and include, for example, a video camera, a still camera, and a car navigation system.

Each device may additionally include necessary functions such as an antenna and a communication interface.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory tangible storage medium (for example, an external storage device (a hard disk, a USB memory, a CD/BD, or the like) of dedicated or general-purpose hardware, or an internal storage device (a RAM, a ROM, or the like)) may also be provided to dedicated or general-purpose hardware via the recording medium or from a server via a communication line without using the recording medium. As a result, it is possible to always provide a latest function by updating the program.

The update control device according to the present disclosure has been described mainly to use for an in-vehicle electronic control unit mounted on a vehicle, alternatively, the update control device may be applied to general mobile bodies such as a motorcycle, a ship, a train, and an aircraft. Further, the present invention is applicable not only to mobile objects but also to general products including microcomputers.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An update control device connected via a communication network to a first electronic control unit on which a first software is installed and a second electronic control unit on which a second software is installed, the update control device comprising:
   one or more processors configured to provide:
      a file acquisition unit that acquires a first update file for updating the first software and a second update file for updating the second software;
      an update order determination unit that determines an update order that the updating of the second software is executed after the updating of the first software is executed in a case where the first update file is an update file for updating the first software that is an application software, and the second update file is an update file for updating the second software that is a basic software as a basis on which the application software operates; and
      an update instruction unit that updates the first software using the first update file and updates the second software using the second update file according to the update order;
   wherein:
   the update control device is connected via the communication network to a third electronic control unit on which a third software is installed;
   the update control device further comprises a memory information acquisition unit, provided by the one or more processors, that acquires memory information indicating a first available memory capacity that is a free space of a first memory of the first electronic control unit and a second available memory capacity that is a free space of a second memory of the third electronic control unit;
   the file acquisition unit further acquires a third update file for updating the third software, which is an application software; and
   the update order determination unit determines the update order of the first software and the third software based on a data amount of the first update file as a first data amount, a data amount of the second update file as a second data amount, the first available memory capacity and the second available memory capacity.

2. The update control device according to claim 1, wherein:
   the update order determination unit determines the update order in which the updating of the second software is executed after the updating of the first software is completed.

3. The update control device according to claim 1, wherein:
   when the first data amount is smaller than the first available memory capacity and the second data amount is larger than the second available memory capacity, the update order determination unit determines the update order in which the updating of the third software is executed after the updating of the first software is executed.

4. The update control device according to claim 1, wherein:

when the first data amount is smaller than the first available memory capacity, the second data amount is smaller than the second available memory capacity, and the second data amount is larger than the first data amount, the update order determination unit determines the update order in which the updating of the third software is executed after the updating of the first software is executed.

5. The update control device according to claim 1, wherein:

the update order determination unit determines the update order further based on a numerical number of storage regions of the first memory and a numerical number of storage regions of the second memory.

6. The update control device according to claim 5, wherein:

when the first memory has a plurality of storage regions and the second memory has a single storage region, the update order determination unit determines the update order in which the updating of the third software is executed after the updating of the first software is executed.

7. The update control device according to claim 1, wherein:

when the updating of the second software using the second update file fails, the update instruction unit instructs to return the first software to be in a state before updating the first software using the first update file.

8. The update control device according to claim 1, wherein:

when the updating of the first software using the first update file fails, the update instruction unit instructs to stop updating the second software using the second update file.

9. The update control device according to claim 1, wherein:

the update control device is mounted on a mobile object together with the first electronic control unit and the second electronic control unit.

10. The update control device according to claim 1, wherein:

the first electronic control unit and the second electronic control unit are mounted on a mobile object; and
the update control device is disposed outside the mobile object.

11. An update control method executed by an update control device connected via a communication network to a first electronic control unit on which a first software is installed, a second electronic control unit on which a second software is installed, and a third electronic control unit on which a third software is installed, the update control method comprising:

acquiring a first update file for updating the first software and a second update file for updating the second software;

determining an update order that the updating of the second software is executed after the updating of the first software is executed in a case where the first update file is an update file for updating the first software that is an application software, and the second update file is an update file for updating the second software that is a basic software as a basis on which the application software operates;

updating the first software using the first update file and updating the second software using the second update file according to the update order;

acquiring memory information indicating a first available memory capacity that is a free space of a first memory of the first electronic control unit and a second available memory capacity that is a free space of a second memory of the third electronic control unit;

acquiring a third update file for updating the third software of the third electronic control unit, which is an application software; and determining the update order of the first software and the third software based on a data amount of the first update file as a first data amount, a data amount of the second update file as a second data amount, the first available memory capacity and the second available memory capacity.

12. A non-transitory tangible computer readable storage medium comprising instructions being executed by an update control device connected via a communication network to a first electronic control unit on which a first software is installed, a second electronic control unit on which a second software is installed, and a third electronic control unit on which a third software is installed, the instructions comprising:

acquiring a first update file for updating the first software and a second update file for updating the second software;

determining an update order that the updating of the second software is executed after the updating of the first software is executed in a case where the first update file is an update file for updating the first software that is an application software, and the second update file is an update file for updating the second software that is a basic software as a basis on which the application software operates;

updating the first software using the first update file and updating the second software using the second update file according to the update order;

acquiring memory information indicating a first available memory capacity that is a free space of a first memory of the first electronic control unit and a second available memory capacity that is a free space of a second memory of the third electronic control unit;

acquiring a third update file for updating the third software of the third electronic control unit, which is an application software; and determining the update order of the first software and the third software based on a data amount of the first update file as a first data amount, a data amount of the second update file as a second data amount, the first available memory capacity and the second available memory capacity.

* * * * *